US005511297A

United States Patent [19]

Cross

[11] Patent Number: 5,511,297

[45] Date of Patent: Apr. 30, 1996

[54] HORSESHOE CLIP RING CRIMPER APPARATUS

[75] Inventor: James L. Cross, 351 B E. 91st St., Chicago, Ill. 60619

[73] Assignee: James L. Cross, Chicago, Ill.

[21] Appl. No.: 250,531

[22] Filed: May 31, 1994

[51] Int. Cl.[6] .................... B23P 19/04

[52] U.S. Cl. .................... 29/243.56; 29/268; 29/283.5; 81/424.5

[58] Field of Search .................... 29/243.56, 268, 29/283.5, 509; 72/410; 81/9.3, 424.5, 426.5

[56] References Cited

U.S. PATENT DOCUMENTS

| | | | |
|---|---|---|---|
| 203,272 | 5/1878 | Hill | 72/410 |
| 1,333,243 | 3/1920 | Bowers | 81/424.5 |
| 4,644,625 | 2/1987 | Sheppard | 29/268 |

FOREIGN PATENT DOCUMENTS

| | | |
|---|---|---|
| 147287 | 7/1952 | Australia . |

*Primary Examiner*—Robert C. Watson
*Attorney, Agent, or Firm*—Hill, Steadman & Simpson

[57] ABSTRACT

A horseshoe clip ring extractor and crimper apparatus and also a method for extracting and replacing a horseshoe clip on a lug using same are provided. The horseshoe clip extractor has a first handle and a second handle pivotally connected such that a plunger is forced against spreader fingers in the head of the tool and forces them apart while applying force to the lug so that the open end of the clip ring is forcibly separated and opened by clip prongs on the ends of the spreader fingers, thereby pushing and forcing the lug out the open end of the horseshoe clip. The horseshoe clip ring crimper for replacing a horseshoe clip has a first handle. The crimper also has a curved jaw with a flat surface at one end of the first handle and a second handle pivotally connected to the first handle. The crimper further has a corresponding curved jaw at one end of the second handle. In addition, the curved jaws form an opening receiving the horseshoe clip. Also, the crimper has a recessed ledge located in an inner portion of the opening. The recessed ledge is constructed and arranged to support the horseshoe clip in a plane parallel to one side of the jaws.

6 Claims, 3 Drawing Sheets

HORSESHOE CLIP RING CRIMPER APPARATUS

BACKGROUND OF THE INVENTION

The present invention is generally directed to hand tools and more specifically to a horseshoe clip ring extractor/crimper and a method for operating same.

It is commonly known in the field of automotive repair for a mechanic to make use of many specialized tools to perform several of the tasks at hand. Although repairing an automobile is becoming much more of a high technology computerized operation, the use of hand tools, especially those which are specialized to an individual task, is still commonplace and extremely advantageous in performing certain automotive repair tasks.

Specialized tools are commonly designed to be used for one type of operation. Because many tasks in the automotive repair industry are repetitive and continuously performed, the mechanic must often make use of a specialized tool to increase efficiency. The increased through-put of automobiles through the automotive repair shop thus increases profits. When the mechanic is provided with a specialized tool, it enables an increase in efficiency of performing the specific task, and the goals of increased efficiency in the automotive repair shop are achieved.

Many parts commonly used in an automobile are unique. For example, the method of attaching or extracting a certain part can be more efficiently achieved using a tool adapted particularly for performing such a task. One particular part used commonly in automotive brakes is a horseshoe clip. As the name suggests, the clip is shaped generally like a horseshoe and is often used to secure a lug to a brake shoe arm. The operation of extracting and recrimping this type of horseshoe clip has been problematic for the automotive mechanic. Usually more than one tool is required to perform such a task, and the mechanic may also be required to use both hands at the same time to operate both tools simultaneously.

Accordingly, there has arisen a need for a method and an apparatus for extracting and recrimping a horseshoe clip with single-handed operation.

SUMMARY OF THE INVENTION

The present invention provides a method and an apparatus for extracting and replacing a horseshoe clip ring.

To this end, in an embodiment, the present invention provides a method for replacing a horseshoe clip ring on a lug using a horseshoe clip ring extractor having a pair of handles for actuating a plunger and a pair of spreader fingers with clip prongs at an end thereof, and a horseshoe clip crimper, having the steps of positioning the top of the horseshoe clip extractor against the horseshoe clip and lug so that the lug is located between the spreader fingers and the open end of the horseshoe clip impinges upon the clip prongs on the spreader fingers, and applying a force to the pair of handles of the horseshoe clip extractor so that the plunger of the horseshoe clip extractor forces the pair of spreader fingers apart and also forces the lug toward the clip prongs until the clip prongs force the open end of the horseshoe clip open sufficiently to allow the lug to pass therethrough.

In an embodiment, a horseshoe clip extractor apparatus is provided. The extractor apparatus has a first handle with at one end thereof, a base supporting a pair of spreader fingers with clip prongs at the ends thereof, a second handle pivotally connected to the first handle, wherein an end of the second handle has a plunger rod having a plunger head connected thereto, a spring encircling the plunger rod, and a pair of retainer tabs for urging the spreader fingers together.

It is, therefore, an advantage of the present invention to provide a method and an apparatus for extracting and for replacing a horseshoe clip ring on a lug.

A further advantage of the present invention is to provide an apparatus acting in accordance with the method of the present invention that is conducive for a single-handed operation by a user.

Yet another advantage of the present invention is to provide a method and an apparatus for extracting and replacing a horseshoe clip ring.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention provides a horseshoe clip ring extractor/crimper apparatus for the removal and reattachment of a horseshoe clip ring. Such a horseshoe clip ring is commonly found on automotive brakes. The extractor/crimper apparatus consists of two parts. The first part is an extractor tool, and the second part is a crimper tool.

Figure 1:
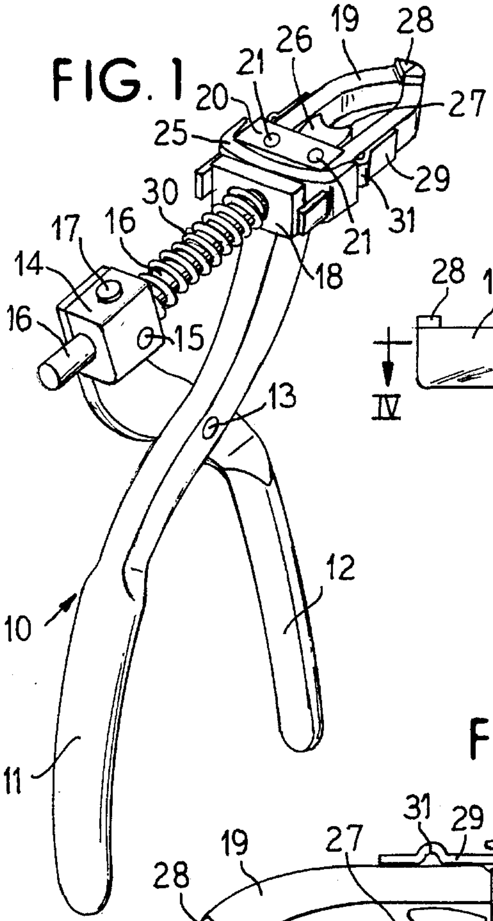
FIG. 1 illustrates a perspective view of an embodiment of the horseshoe clip ring extractor of the present invention.

Now referring to embodiments of the present invention as illustrated in the figures, FIG. 1 shows a horseshoe clip ring extractor tool 10 in perspective view. The extractor tool 10 consists of several parts. The extractor tool 10 is a hand-held and operated tool consisting of a base handle 11 connected to a plunger handle 12. A main pivot pin 13 provides a fulcrum for the two handles 11, 12 to operate the tool 10. The plunger handle 12 has at its end a plunger base 14 that also has a plunger pivot pin 15 about which it may rotate on the plunger handle 12.

Further, a plunger 16 extends through the plunger base 14 and is attached thereto by a set screw 17. The plunger 16 also passes through a support base 18. The support base 18 is located at the end of the base handle 11. The support base 18 is used to support a pair of spreader fingers 19 on the spreader finger base 20. One end of each of the spreader fingers 19 is pivotally connected to the support base 18 via a pair of spreader finger pivot pins 21. Also, a spreader finger plate 22 secures the spreader fingers 19 to the support base 18.

The plunger 16 travels through a hole 23 in the support base 18 and a hole 24 in a base clip 25. The plunger 16 has a head 26 that is located within the confines of the spreader fingers 19. The plunger head 26 also has a curved recess 27 at its end.

Also, illustrated on each spreader finger 19 is a clip prong 28 at the end thereof, opposite the end having the spreader finger pivot pin 21. An additional component of the horseshoe clip extractor tool 10 is a retainer tab 29 located on the outside of each spreader finger 19. One retainer tab 29 is provided for each spreader finger 19. One end of the retainer tab 29 extends partially along the length of the spreader finger 19. The other end of the retainer tab 29 is secured by the base clip 25. The retainer tab 29 secured by the base clip 25 provides additional strength to keep the spreader fingers 19 closed when the extractor tool 10 is in a normal state.

Further illustrated in FIG. 1 is a plunger spring 30 surrounding the plunger 16 and located between the plunger base 14 and the support base 18. The spring 30 acts to keep the handles separated when the extractor tool 10 is in a normal condition.

Figure 2:
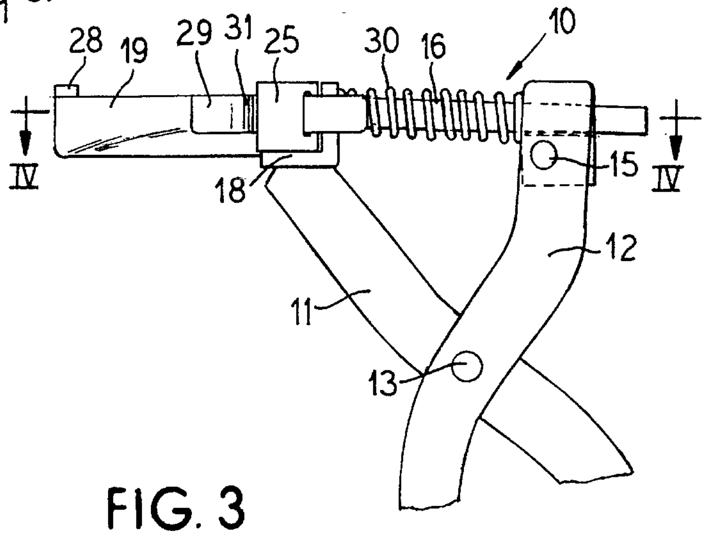
FIG. 2 illustrates a side view of an embodiment of the horseshoe clip ring extractor of the present invention.

FIG. 2 also illustrates an embodiment of the horseshoe clip extractor tool 10 of the present invention. The side view of FIG. 2 illustrates many of the same components already enumerated in the discussion of FIG. 1 wherein like numerals designate like parts.

Figure 3:
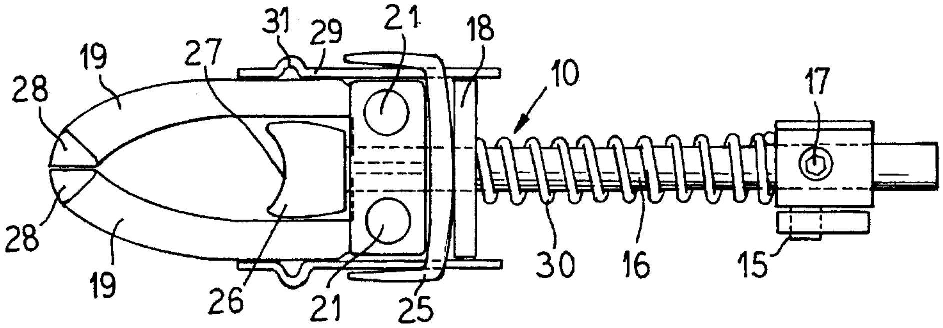
FIG. 3 illustrates a top view of an embodiment of the horseshoe clip ring extractor of the present invention.

To further illustrate an embodiment of the present invention, FIG. 3 shows a top view of the horseshoe clip extractor tool 10. As illustrated, one end of the plunger 16 is firmly fastened to the plunger base 14 by the set screw 17. The spring 30 presses against the plunger base 14 at one end and circumscribes the plunger 16 so that the other end of the spring 30 presses against the support base 18. The support base 18, in turn, presses against the base clip 25 when the present invention is operated as intended. The base clip 25 further confines the pair of spreader fingers 19. Also illustrated in FIG. 3 are the spreader finger pivot pins 21 about which the spreader fingers 19 rotate.

As further illustrated, the retainer tab 29 on the side of each of the spreader fingers 19 acts to urge the spreader fingers 19 together in a normal state with the additional assistance of the base clip 25. The retainer tab 29 further comprises a retainer tab bend 31 to provide additional strength to the retainer tab 29 thereby urging the spreader fingers 19 against one another at the end having the clip prongs 28. The plunger head 26 resides in between the spreader fingers 19. The clip prongs 28 found at the end of the spreader fingers 19 are preferably wedge-shaped, although other shapes are within the bounds of the disclosure of the present invention.

Figure 4:
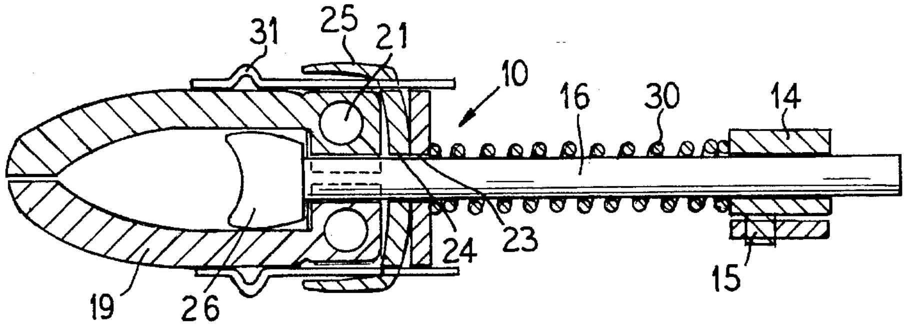
FIG. 4 illustrates a cut-away view of an embodiment of the horseshoe clip ring extractor of the present invention taken generally along line IV—IV as shown in FIG. 2 of the present invention.

FIG. 4 further illustrates a cut-away view of an embodiment of the present invention. As above, several elements of the horseshoe clip extracting tool 10 are illustrated. The hole 23 in the support base 18 and the hole 29 in the base clip 25 are also shown.

Figure 5:
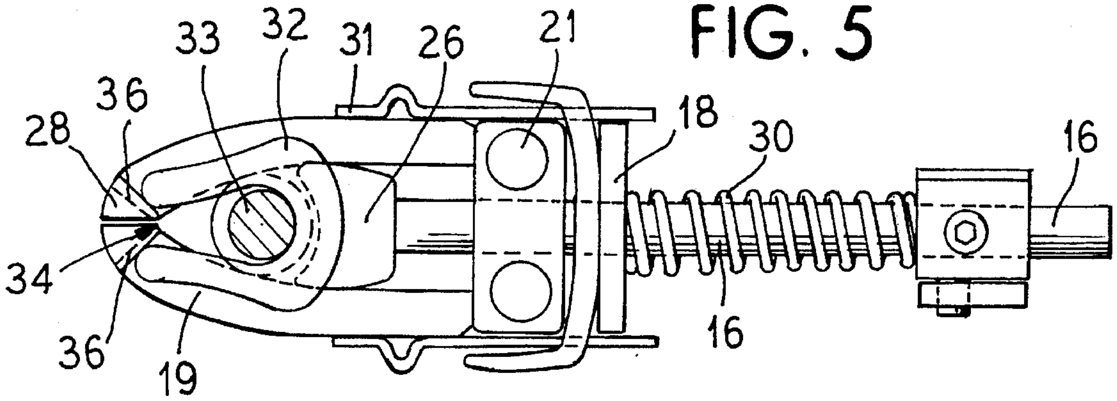
FIG. 5 illustrates an embodiment of the horseshoe clip ring extractor of the present invention further illustrating a horseshoe clip surrounding a lug.

FIG. 5 illustrates a horseshoe clip 32 connected to a clip lug 33 such that the open end 34 of the horseshoe clip 32 impinges upon the wedge-shaped clip prongs 28 of the horseshoe clip extractor tool 10. The clip prongs 28 are advantageously provided with an indentation 36. The horseshoe clip 32 rides in the indentation 36. (The dashed line in FIG. 5 illustrates the indentations 36 of the clip prongs 28 for guiding the horseshoe clip 32 during operation of the horseshoe clip extractor tool 10.) The horseshoe clip 32 is lifted slightly thereby for proper operation of the extracting tool 10.

As illustrated, the plunger head 26 presses against the inner side of the spreader fingers 19 to cause the clip prongs 28 to separate slightly while, at the same time, the plunger head recess 27 forces the lug 33 toward the end of the spreader fingers 19. By doing this, the open end 34 of the horseshoe clip 32 is forced open by the wedge-shaped clip prongs 28. In addition, the plunger head recess 27 is also, at the same time, forcing the lug 33 out of the now widened open end 34 of the horseshoe clip 32.

An application of a force to the handles 11, 12 of the horseshoe clip extractor tool 10 causes a compression of the spring 30 which forces the spring 30 against the support base 18 and the base clip 25 thereby moving the plunger head 26 against the lug 33. The plunger head 26 presses against the lug 33 until the open end 34 of the horseshoe clip 32 is wide enough so that the lug 33 can exit at the open end 34 of the horseshoe clip 32 between the clip prongs 28. Thus, the horseshoe clip 32 is separated from the lug 33.

Figure 6:
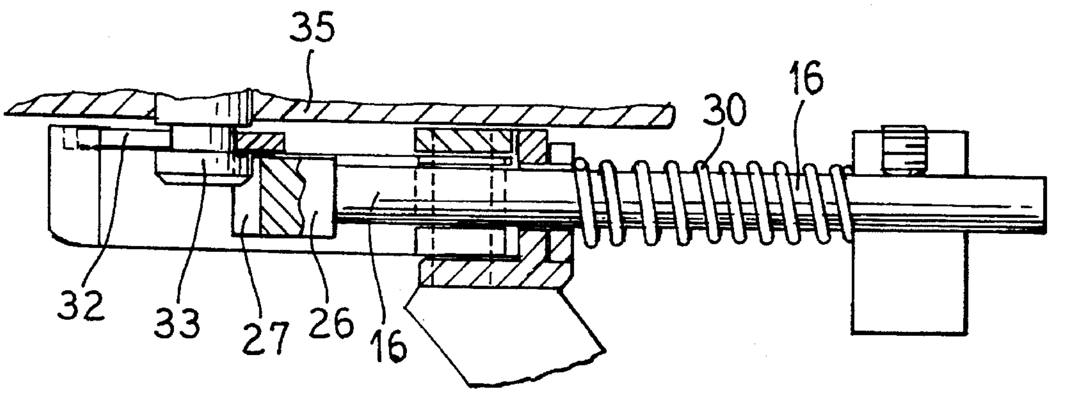
FIG. 6 illustrates a side view in partial cut-away of an embodiment of the horseshoe clip ring extractor of the present invention in a typical environment of use.

FIG. 6 illustrates the horseshoe clip extractor 10 of the present invention in an environment of use. For example, the lug 33 shown with a horseshoe clip 32 attached thereto is located on a part 35, for example, an automobile brake. As illustrated, the horseshoe clip extractor tool 10 has a flat upper surface so that it is able to be positioned extremely close to a combination of the lug 33 and the clip 32 so as to easily engage therewith.

Figure 7:
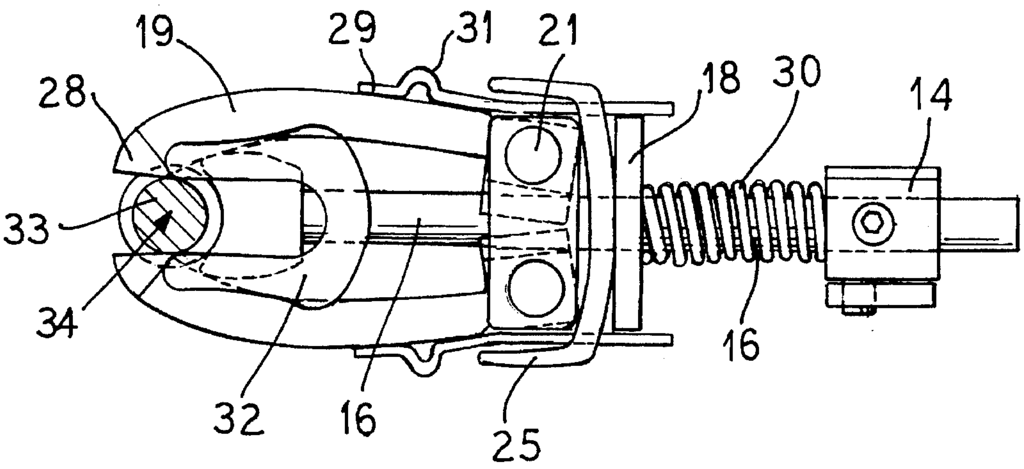
FIG. 7 illustrates an embodiment of the horseshoe clip ring extractor of the present invention in which a horseshoe clip is shown being extracted from a lug.

As explained above, FIG. 7 further illustrates the manner in which the present invention is used to extract the horseshoe clip 32 from the lug 33. As mentioned above, the combined force of the plunger head recess 27 against the lug 33 coupled with the spreading of the spreader fingers 19 and the constant pressure against the clip prongs 28 eventually forces the lug 33 from the widened open end 34 of the horseshoe clip 32.

As illustrated, the plunger spring 30 is in a compressed position at this point, and the spreader fingers 19 are separated, having rotated about their pivot points 21. The retainer tabs 29 press against the spreader fingers 19 during this operation so that the spreader fingers 19 do not spread too far apart prior to and during the operation of the extractor tool 10.

As described above, it is an object of the present invention to provide both a method and an apparatus for extracting and replacing the horseshoe clip 32 on the lug 33. To this end, a horseshoe clip crimper is provided.

Figure 8:
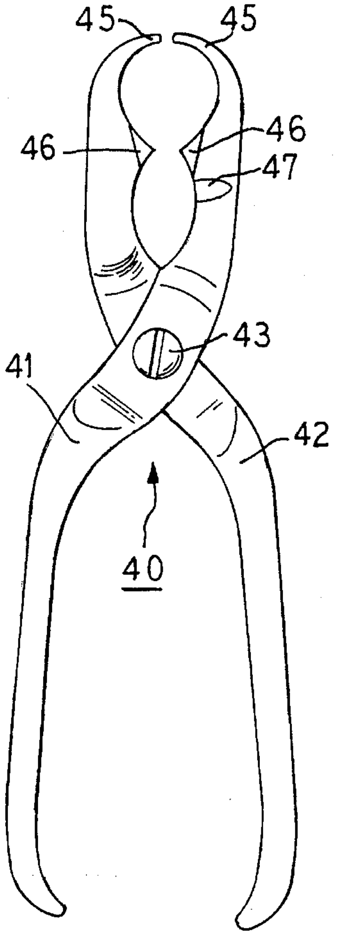
FIG. 8 illustrates a front view of an embodiment of the horseshoe clip ring crimper of the present invention.

FIG. 8 illustrates a front view of a horseshoe clip crimper 40. As illustrated, the horseshoe clip crimper 40 has a lower arm 41 and an upper arm 42 pivotally connected thereto. The horseshoe clip crimper 40 is operated in a plier-like manner. In an embodiment, the pivot point consists of a bolt 43 and a nut 44 (shown in FIG. 9). At the opposite end of the handles 41, 42 is a pair of curved ends 45. Also illustrated in FIG. 8 is a pair of recessed horseshoe clip end ledges 46 for supporting the horseshoe clip 32 during a crimping operation. Further illustrated is a clearance notch 47 for allowing common obstacles, such as brake springs, to be circumvented while using the crimper 40.

Figure 9:
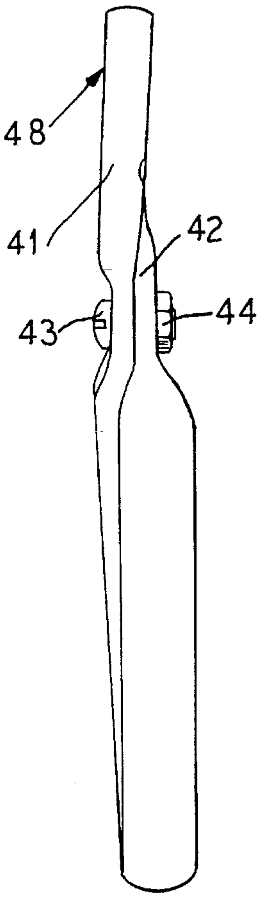
FIG. 9 illustrates a side view of an embodiment of the horseshoe clip ring crimper of the present invention.

FIG. 9 illustrates a side view of the horseshoe clip crimper 40. As illustrated, the lower handle 41 has a flat surface 48 which, coupled with the angling of the handles 41, 42 of the crimper 40 itself outwardly from the flat surface 48, provides for close access of the crimper 40 to a flat work surface, i.e., a brake pad assembly or brake shoe. As illustrated in FIG. 9, the pivot point for handles 41, 42 is a bolt 43 and a nut 44. However, other types of pivots are within the scope of the present invention.

Figure 10:
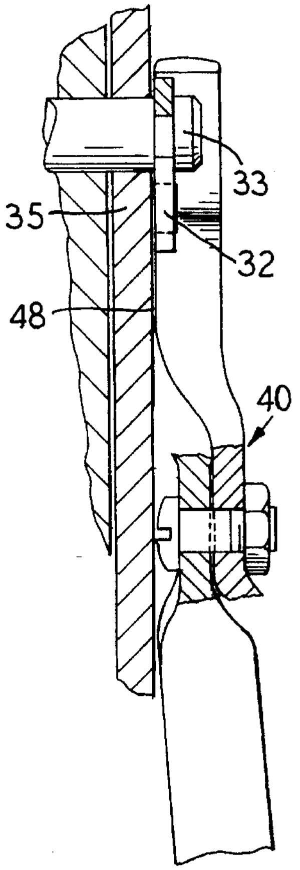
FIG. 10 illustrates a side view in partial cutaway of an embodiment of the horseshoe clip ring crimper of the present invention in a typical environment of use.

FIG. 10 illustrates the horseshoe clip crimper 40 of the present invention in an environment of use. For example, the lug 33 showing the horseshoe clip 32 attached thereto is located on a part 35, for example, an automobile brake assembly. As illustrated, the horseshoe clip crimper 40 has the flat surface 48 so that it can be positioned extremely close to the lug and clip combination so as to easily engage therewith for simple crimping.

Figure 11:
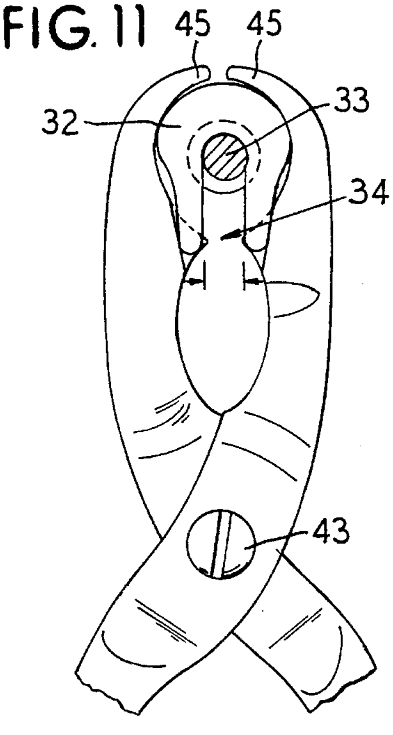
FIG. 11 illustrates an embodiment of the horseshoe clip ring crimper of the present invention in which a horseshoe clip is showing being crimped onto a lug.

FIG. 11 illustrates the initial position of the lug 33 in the horseshoe clip 32 before a crimping operation is initiated. As illustrated, the open end 34 of the horseshoe clip 32 has an initial width. The ends of the horseshoe clip 32 rest on the recessed horseshoe clip end ledges 46, while the curved ends 45 encircle the horseshoe clip 32. By applying pressure to the handles 41, 42, the curved ends 45 of the horseshoe clip crimper 40 are forced together as the handles 41, 42 pivot about the pivot point, i.e., the bolt 43 and the nut 44.

Figure 12:
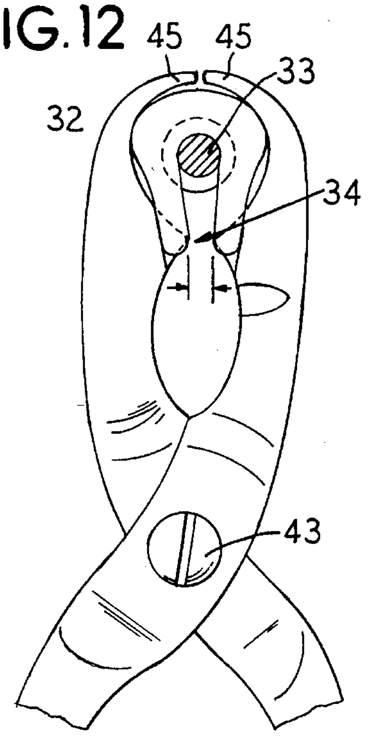
FIG. 12 illustrates an embodiment of the horseshoe clip ring crimper of the present invention in which a horseshoe clip is shown in a near fully crimped position on a lug.

In addition, FIG. 12 illustrates the horseshoe clip and lug combination after the crimping operation is completed. As illustrated in FIG. 12, the open end 34 of the horseshoe clip 32 has a reduced width from the initial width, as the result of the pressure applied to the handles 41, 42. The recessed horseshoe clip end ledges 46 thus hold the horseshoe clip 32 in place while the pressure is applied to the handles 41, 42. These ledges 46 maintain the clip 32 in position and do not allow the clip 32 to snap out of the horseshoe clip crimper 40. Additionally, the crimper 40 is operated so that the flat surface 48 of the horseshoe clip crimper 40 is provided against the part 35 on which the lug 33 is embedded so that the clip 32 is trapped between the part 35 and the crimper 40.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A crimper apparatus for replacing a horseshoe clip, the crimper apparatus comprising:

a first handle;

a curved jaw at one end of the first handle;

a second handle pivotally connected to the first handle at a fulcrum;

a corresponding curved jaw at one end of the second handle, the curved jaws forming a flat surface on one side and further forming an opening receiving the horseshoe clip;

a recessed ledge constructed and arranged to support the horseshoe clip in a plane parallel to one side of the jaws, the recessed ledge formed in the flat surface; and an access notch formed in the flat surface.

2. The crimper apparatus of claim 1 wherein the recessed ledge is formed at a base end of each of the curved jaws.

3. The crimper apparatus of claim 1 wherein the access notch is formed at a point in one of the handles intermediate the recessed ledge and the fulcrum.

4. The crimper apparatus of claim 1 wherein the access notch is formed on the same side as the flat surface.

5. The crimper apparatus of claim 1 wherein an end of each of the curved jaws meet in a closed portion of the handles.

6. The crimper apparatus of claim 1 wherein the fulcrum defines a vertex between the flat surface and gripping surfaces of the handle.

* * * * *